(12) United States Patent
Nicole et al.

(10) Patent No.: US 12,385,844 B2
(45) Date of Patent: Aug. 12, 2025

(54) METHODS AND SYSTEMS FOR DETERMINING THE GROWTH STAGE OF A PLANT

(71) Applicant: SIGNIFY HOLDING B.V., Eindhoven (NL)

(72) Inventors: Céline Catherine Sarah Nicole, Eindhoven (NL); Dragan Sekoulovski, Eindhoven (NL); Harry Broers, 's-Hertogenbosch (NL); Marc Andre De Samber, Lommel (BE)

(73) Assignee: SIGNIFY HOLDING B.V., Eindhoven (NL)

( * ) Notice: Subject to any disclaimer, the term of this patent is extended or adjusted under 35 U.S.C. 154(b) by 171 days.

(21) Appl. No.: 18/009,715

(22) PCT Filed: Jun. 17, 2021

(86) PCT No.: PCT/EP2021/066385
§ 371 (c)(1),
(2) Date: Dec. 10, 2022

(87) PCT Pub. No.: WO2022/002610
PCT Pub. Date: Jan. 6, 2022

(65) Prior Publication Data
US 2023/0243756 A1  Aug. 3, 2023

(30) Foreign Application Priority Data
Jul. 3, 2020  (EP) ...................................... 20183964

(51) Int. Cl.
*G01N 21/84*  (2006.01)
*A01G 7/00*  (2006.01)
(Continued)

(52) U.S. Cl.
CPC ............... *G01N 21/84* (2013.01); *A01G 7/00* (2013.01); *G01N 21/21* (2013.01); *G01N 2021/8466* (2013.01); *G01N 2021/8848* (2013.01)

(58) Field of Classification Search
CPC ................... G01N 21/84; G01N 21/21; G01N 2021/8466; G01N 2021/8848; A01G 7/00
See application file for complete search history.

(56) References Cited

U.S. PATENT DOCUMENTS

RE31,023 E  *  9/1982  Hall, III  ...................  A01G 7/00
                                                         193/25 E
4,569,150 A  *  2/1986  Carlson  ....................  A01G 9/18
                                                         47/17
(Continued)

FOREIGN PATENT DOCUMENTS

CN  108803755 A  11/2018
EP  3361448 A1  8/2018
(Continued)

OTHER PUBLICATIONS

Maxwell et al. "The Effects of Plant Virus Infection on Polarization Reflection from Leaves"; Plos One | DOI:10.1371/journal.pone.0152836 Apr. 21, 2016.*
(Continued)

*Primary Examiner* — Mohamed K Amara

(57) ABSTRACT

A method for determining the growth stage of a plant is disclosed. The method comprises illuminating the plant with illumination light. The illumination light causes response light from the plant. The method further comprises detecting the response light from the plant, and, based on the detected response light, determining the growth stage of the plant. In this method, (i) illuminating the plant comprises illuminating with at least partially polarized illumination light, and/or (Continued)

(ii) detecting the response light comprises polarization filtering the response light.

8 Claims, 9 Drawing Sheets

(51) Int. Cl.
*G01N 21/21* (2006.01)
*G01N 21/88* (2006.01)

(56) References Cited

U.S. PATENT DOCUMENTS

| | | | | |
|---|---|---|---|---|
| 5,323,567 | A * | 6/1994 | Nakayama | A01G 9/249 47/65 |
| 8,061,080 | B2 * | 11/2011 | Loebl | A01G 9/249 47/58.1 LS |
| 11,074,447 | B1 * | 7/2021 | Fox | G06N 3/08 |
| 11,166,415 | B2 * | 11/2021 | Barber, III | A61L 2/0076 |
| 11,538,099 | B2 * | 12/2022 | Greenberg | G05B 15/02 |
| 12,007,374 | B2 * | 6/2024 | Kartci | A01G 7/00 |
| 2016/0202679 | A1 * | 7/2016 | Bermudez Rodriguez | G05B 19/042 700/284 |
| 2017/0131200 | A1 | 5/2017 | Raveh et al. | |
| 2018/0206422 | A1 * | 7/2018 | Vandecruys | A01G 7/02 |
| 2019/0021238 | A1 * | 1/2019 | Alexander | B25J 19/023 |
| 2019/0134508 | A1 * | 5/2019 | Matsuzawa | A63F 13/213 |
| 2019/0174077 | A1 | 6/2019 | Mitani et al. | |
| 2019/0178470 | A1 | 6/2019 | Usami et al. | |
| 2019/0259108 | A1 | 8/2019 | Bongartz et al. | |
| 2019/0313494 | A1 | 10/2019 | Sweegers et al. | |
| 2020/0134741 | A1 * | 4/2020 | Bongartz | A01G 31/02 |
| 2020/0184153 | A1 * | 6/2020 | Bongartz | A01G 9/249 |
| 2021/0056685 | A1 * | 2/2021 | Zhang | G06T 7/0004 |
| 2021/0267139 | A1 * | 9/2021 | Kuniyasu | G02B 5/3016 |

FOREIGN PATENT DOCUMENTS

| | | | |
|---|---|---|---|
| JP | 2017134585 A | 8/2017 | |
| WO | WO-2011102520 A1 * | 8/2011 | A01G 16/00 |
| WO | WO-2019109384 A1 * | 6/2019 | A01B 79/005 |

OTHER PUBLICATIONS

Verdouw, Cor, "Augmented Reality in horticulture: green glasses instead of green fingers", Mprise Agriware.
Reif, R. et al., "Evaluation of an Augmented Reality Supported Picking System Under Practical Conditions", Computer Graphics Forum, DOI: 10.1111/j.1467-8659.2009.02538.x, vol. 29 (2010), No. 1 pp. 2-12.
Dean, Sam, "Visualize it: Augmented Reality and the Future of Food", Sep. 25, 2017. Restaurant Tech Virtual Reality. https://thespoon.tech/visualize-it-augmented-reality-and-the-future-of-food-production/.
Xu, Jun-Li et al., "A polarized hyperspectral imaging system for in vivo detection: Multiple applications in sunflower leaf analysis", Computers and Electronics in Agriculture, vol. 158 (2019) pp. 258-270. XP085612492, Issn: 0168-1699, DOI: 10.1016/J.COMPAQ.2019.02.008.
Vanderbilt, Vern C. et al., "Mueller Matrix of a Dicot Leaf", Polarization: Measurement, Analysis, and Remote Sensing X, SPIE, 1000 20th St. Bellingham WA 98225-6705 USA, vol. 8364, No. 1, May 11 (May 11, 2012), pp. 1-6, XP060012172, DOI: 10.1117/12.919480.
Livingston et al., "Cannabis glandular trichomes alter morphology and metabolite content during", The Plant Journal, vol. 101, 2020, pp. 37-56.

* cited by examiner

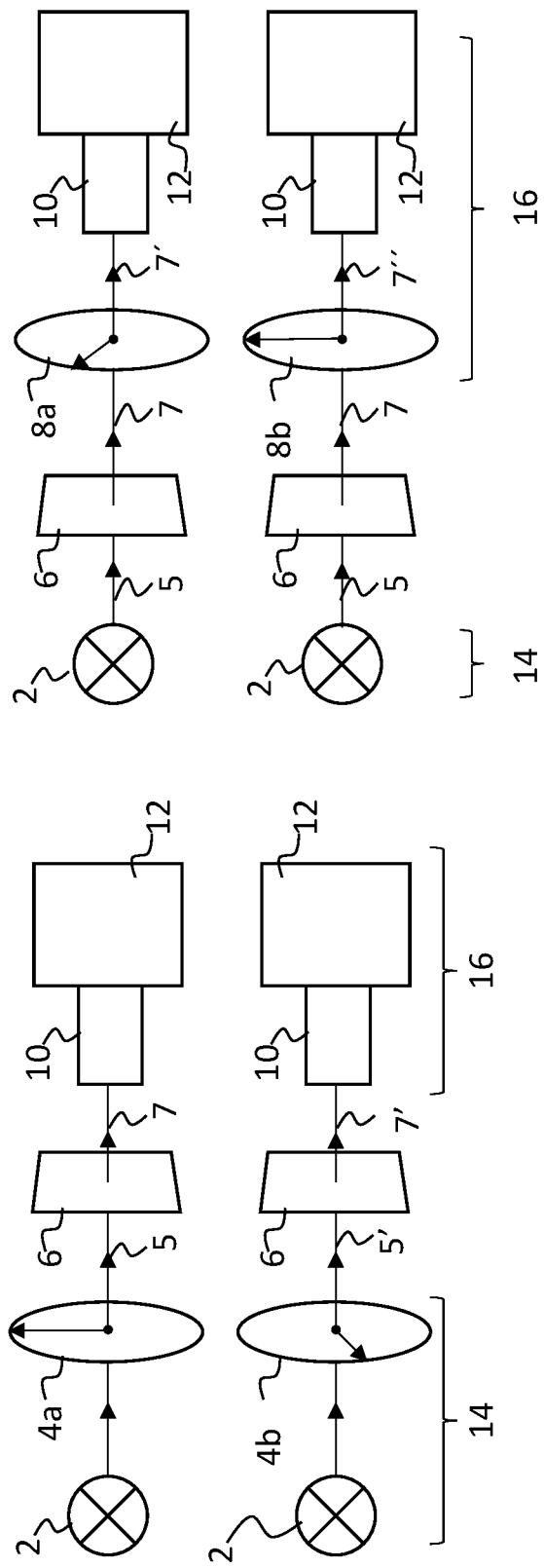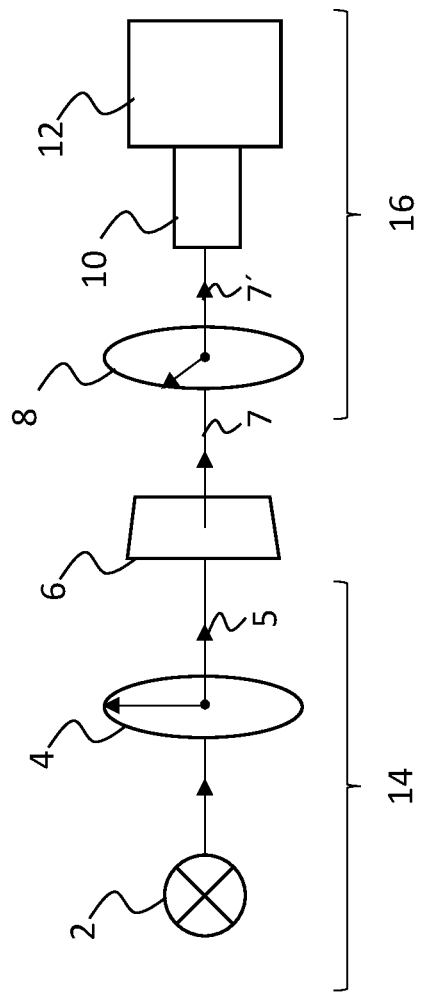

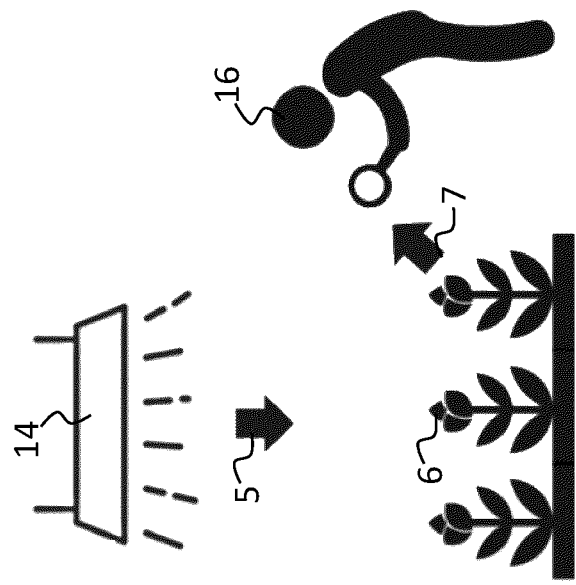
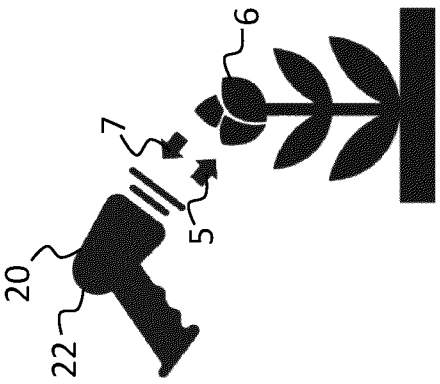
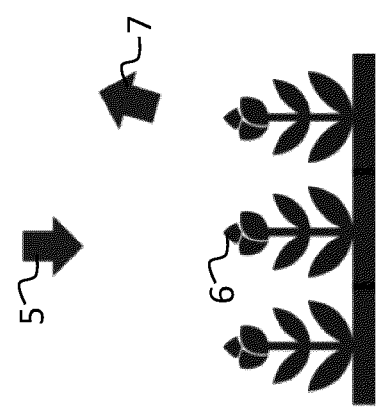
Fig. 3A
Fig. 3B
Fig. 3C
Fig. 3D

METHODS AND SYSTEMS FOR DETERMINING THE GROWTH STAGE OF A PLANT

CROSS-REFERENCE TO PRIOR APPLICATIONS

This application is the U.S. National Phase application under 35 U.S.C. § 371 of International Application No. PCT/EP2021/066385, filed on Jun. 17, 2021, which claims the benefit of European Patent Application No. 20183964.4, filed on Jul. 3, 2020. These applications are hereby incorporated by reference herein.

FIELD OF THE INVENTION

This disclosure relates to methods and systems for determining the growth stage of a plant, in particular to such methods and systems that employ polarized light.

BACKGROUND

Harvesting plants, such as flower carrying plants, at the right time can be very important. Harvesting too late may cause the plants to deteriorate fast after harvesting as they may be over ripe. Harvesting too early may prevent the plant to develop desired characteristics in its flowers, such as the presence of certain compounds and/or desired shape or form.

Cannabis plants, for example, ripen within a specific time frame and it is highly preferred to pick the flowers at the right time for obtaining optimal culture results. The evolution of a cannabis flower ripening process comprises a number of stages and includes the formation of stigmas and the formation of trichomes on the flower—approximately at the time when the stigmas change colour to brown and dry out.

The trichomes gradually grow, become prominent and eventually change colour from transparent/clear towards white/milky and finally amber. The best time for harvesting the flower would approximately be when less than 10% of the trichomes have changed to amber and most of the trichomes are white/milky. When more of the trichomes start colouring amber, the bud becomes over ripe. This might however be species dependent.

Production of cannabis compounds in the aim of manufacturing medicine requires that the product meets standards of the pharmaceutical industry. Not only should the plant be produced under controlled conditions and without the use of pesticides, also the active ingredients should be present in appropriate amounts and uniform across the canopy.

To date, judgment of ripeness of Cannabis flowers still relies on human experience and remains a labour-intensive task. Farmers need to go through a plantation, assess the trichomes, for example with a magnifying glass, pick the ripe flowers based on their expert judgment and leave the unripe flowers on the plant till a next harvest exploration.

According to the authors of Livingston et al, The Plant Journal (2020), 101, 37-56, *Cannabis glandular trichomes alter morphology and metabolite content during flower maturation*, uncovering the properties of trichomes and the genes that are highly expressed within them, may provide new opportunities for informed harvest timing. The authors have investigated properties of cannabis trichomes using advanced microscopy techniques, such as a two-photon laser scanning fluorescence microscopy approach, where a red-shifted pulsed laser is used to penetrate deep into live tissues and excite the intrinsic fluorescence of metabolites. The authors further use Transmission Electron Microscopy and microcapillary probing. However, clearly such techniques are unsuitable for use in the field, especially by an unskilled user.

Hence, in light of the above, there is a need in the art for a method that allows to accurately and easily determine the growth stage of a plant.

SUMMARY

To that end, a method for determining the growth stage of a plant is disclosed. The method comprises illuminating the plant with illumination light. The illumination light causes response light from the plant. The method further comprises detecting the response light from the plant, and, based on the detected response light, determining the growth stage of the plant. In this method, (i) illuminating the plant comprises illuminating with at least partially polarized illumination light, and/or (ii) detecting the response light comprises polarization filtering the response light.

The inventors have recognized that during the growth of a plant, the optical properties of at least parts of the plant may change. At some parts of the plant for example, new structures and/or material may develop that have distinguishing optical properties from already present structures and/or materials constituting the plant. In particular, these distinguishing optical properties may relate to the polarization characteristics. Newly developed structures may rotate a polarization direction of incident light differently than the rest of the plant. Additionally or alternatively, the newly developed structures may selectively reflect only specific directions of polarization while the rest of the plant does not exhibit such selective reflection or at least exhibits a different selectivity for reflecting specific polarizations.

The methods disclosed herein conveniently make use of such distinguishing polarization characteristics by simply illuminating the plant with at least partially polarized illumination light and/or by detecting the response light using one or more polarization filters. This allows to reveal the polarization active structures/materials that form or disappear during the growth of the plant. The growth of a plant may also be referred to as the development or ripeness of the plant or of parts thereof, such as flowers. A growth stage may thus also be referred to as a stage of development and/or a ripening stage.

Advantageously, because the method requires relatively simple elements such as polarization filters, the method can be easily performed in the field in real-time and without having to damage or even touch the plant. A farmer can go into the field and determine the growth stages of respective plants very easily and may decide to harvest the plant or one or more parts thereof.

Illuminating the plant does not necessarily involve illuminating the entire plant, only specific parts of the plant may be illuminated, such as parts on which the structures with differing optical properties are developed, for example a flower.

Determining the growth stage may comprise classifying the plant into a class out of a set of two or more classes that are respectively associated with different stages of growth. In such case, one class is for example associated with an early growth stage while another class is associated with a middle growth stage while yet another class is associated with a late growth stage. An early growth stage may be a stage where a flower or other part of the plant has not started ripening yet, a middle growth stage may be a stage where such flower or other part has started ripening but is not yet ripe, the late growth stage may be a stage where such flower or other part has fully ripened. The step of determining the growth stage may be performed by a data processing system, i.e. this step may be computer-implemented.

Determining the growth stage may comprise quantifying the structures/material of interest on specific parts of the plant. Such quantification would then be an indication of the growth stage of the plant.

In an embodiment, determining the growth stage of a plant and/or performing the above mentioned quantification of the structures/materials of interest is performed on the basis of a training data set in which respective detected responses from one or more plants are associated with respective human expert assessments of the plant's growth stage and/or respective human expert assessments of the quantity of the structures/material of interest on the plant. In an example, it may be determined that a detected response light resembles a response light from a plant that was verified by a human expert as perfectly ripe.

The response light may comprise illumination light that has been reflected and/or transmitted by the plant. Additionally or alternatively, the response light may comprise photoluminescent light, such as fluorescent light. This may for example be the case if the illumination light photo-excites the plant or parts thereof. Photoluminescence may be understood to be luminescence that is caused by the absorption of photons.

Degree of polarization (DOP) may be understood to indicate which portion of an electromagnetic wave is polarized. For example, a perfectly polarized wave may have a DOP of 100%, whereas an unpolarized wave may have a DOP of 0%. A wave which is partially polarized, and therefore can be represented by a superposition of a polarized and unpolarized component, will have a DOP somewhere in between 0 and 100%. DOP may be the ratio between the power that is carried by the polarized component of the wave and the power that is carried by the wave as a whole.

The at least partially polarized illumination light for example has a degree of polarization (DOP) of at least 5% or of at least 10% or of at least 20% or of at least 30% or of at least 40% or of at least 50% or of at least 60% or of at least 70% or of at least 80% or of at least 90%. If light is not at least partially polarized, it may be referred to as unpolarized light.

Light may be understood to be at least partially polarized if it is polarized in more than one, e.g. two or three, directions. In such case, the electromagnetic wave may be represented by a superposition of several polarized components and optionally an unpolarized component. Such at least partially polarized illumination light for example has a ratio between the power of a component in one direction and the power that is carried by the wave as a whole of at least 5% or of at least 10% or of at least 20% or of at least 30% or of at least 40% or of at least 50% or of at least 60% or of at least 70% or of at least 80% or of at least 90%.

A direction of the light's polarization may be defined as the direction parallel to the electric field of the electromagnetic wave describing the light. Furthermore, it should be appreciated that a particular direction of polarization may be understood to comprise a range of directions, e.g. all directions between −2 degrees and +2 degrees from said particular direction. To illustrate, if the polarization direction is said to be 20 degrees with respect to a reference direction, then the 20 degrees polarization may comprise all components of the light having a polarization direction between 18 and 22 degrees.

The method may comprise, based on the determined growth stage, harvesting at least part of the plant, such as a flower of the plant.

In an embodiment, the plant is a *Cannabis* plant, e.g. a *Cannabis Sativa* plant, a *Cannabis Sativa* L. plant, or Incica plant. In this embodiment, illuminating the plant may comprise specifically illuminating a female flower of the *Cannabis* plant, because the female flowers are typically consumed, whereas the male flowers are not. The female flowers have so-called specialized metabolites, such as Cannabinoid metabolites, that are known to cause psychoactive and/or medicinal effects. As explained above, with the ripening of the *Cannabis* plant, trichomes develop on the flower, in particular on the canopy of the flower. The trichomes grow, become prominent and also change color multiple times. The inventors have recognized that the trichomes, at least in some stages of their development, have polarization characteristics that differ from the rest of plant. Hence, these distinguishing polarization characteristics can be used to assess the presence and quantity of the trichomes and can therefore be used to assess the ripening of the plant, particularly the ripening of the flower. It is easily understood that when the growth stage of the plant is known, the optimal harvest time can be readily determined. As explained above, *Cannabis* flowers ripen within a specific time frame and it is highly preferred to pick the flowers at the right time for obtaining optimal cultivation results.

The flowering stage of a *Cannabis* plant typically has multiple sub-stages. Determining the growth stage of a *Cannabis* plant is preferably performed by determining in which sub-stage out of these multiple sub-stages the female flower is.

In an embodiment, detecting the response light comprises an, optionally computer-implemented, step of obtaining data representing the detected response light. In such embodiment, the method comprises determining the growth stage of the plant based on the obtained data. This embodiment is advantageous in that it enables automatic determination of the growth stage of the plant, for example using data processing systems, such as image processing systems.

In an embodiment, the obtained data indicate at least one of
a total intensity of the response light,
an average intensity of the response light,
a maximum intensity of the response light,
a minimum intensity of the response light.

These parameters are easy to process and compare, for example easier than an image. This embodiment obviates the need to capture and process images of the plant. Each of the above-mentioned parameters may be compared to an appropriate threshold value. If for example a parameter is above or below such threshold value, then the plant or plant part may be determined to be ready for harvest. Of course, several thresholds may be used if the plant is to be classified in three or more growth stages. Hence, this embodiment allows to ease the analyses for determining the growth stage of the plant and therefore enables fast determination of the growth stage. Such fast determination is particularly advantageous when the method is performed in real-time in the field.

In an embodiment, the method comprises illuminating the plant with first illumination light, wherein the first illumination light causes first response light from the plant, and detecting the first response light from the plant. In this embodiment, the method comprises, thereafter, illuminating the plant with second illumination light, wherein the second illumination light causes second response light from the plant, and detecting the second response light from the plant. This embodiment further comprises, based on the detected first and second response light, determining the growth stage of the plant. This embodiment allows to accurately determine the growth stage as further explained below.

The steps of detecting the first response light and detecting the second response light may be separated in time by at least 5 hours, preferably by at least a day. This advantageously allows to monitor the development of the response light. Preferably, in this embodiment, the first and second illumination light are the same, for example in the sense that they have the same polarization direction or that both the first and second illumination light are unpolarized.

In embodiment, the first illumination light is at least partially polarized light and the second illumination light is unpolarized light. This embodiment enables to identify polarization active parts of the plant in a convenient manner, for example by simply switching between polarized illumination light and unpolarized illumination light. The response light that comes from the polarization active parts changes in a different manner as a result of such a switch than the other parts of the plant. For example, given that the first and second illumination light possess the same total intensity, the first and second response light for the non-polarization active parts of the plant will be the same, because these parts reflect any polarization direction similarly. However, the first and second response light for the polarization active parts are typically different. If for example these parts selectively reflect a particular polarization direction and this particular polarization direction is present in the first illumination light to a different extent than in the second illumination light, which would typically be the case, then the second response light for these parts has a higher or lower intensity than the first response light for these parts.

The unpolarised light may be growth light configured to incite the growth of the plant.

In an embodiment, the first illumination light is at least partially polarized in a first direction and the second illumination light is at least partially polarized in a second direction that is different from the first direction. This embodiment is advantageous in that no polarization filters are required in the detection path. In fact, detecting the response light may involve a human observer simply looking at the plant while it is illuminated with the first and second illumination light subsequently.

In case the plant is a *Cannabis* plant, the trichomes only reflect specific polarization directions. However, the rest of plant reflects unpolarized light, even if the plant is being illuminated with polarized light. A possible explanation for this is internal scattering of the illumination light as will be detailed with reference to FIG. 4B. Therefore, the response light from parts not containing the trichomes, has an intensity that is independent of the polarization direction of the illumination light. On the other hand, since the trichomes selectively reflect certain polarization directions, the response light coming from the trichomes is dependent on the polarization direction of the illumination light. To illustrate, if we assume that a set of trichomes only reflects light of a first particular polarization direction, then the intensity of the response light from this set of trichomes will be close to zero if the polarization direction of the illumination light is perpendicular to the first particular polarization direction, but much higher if the polarization direction of the illumination light is parallel to the first particular direction. Hence, by changing the polarization direction of the illumination light, the intensity of response light for polarization active parts may vary. This leads to a kind of 'highlighting' effect.

If for example the changing of the illumination polarization direction is done 'fast' and 'repetitive' then a easily observable 'flashing' lighting effect is created.

Preferably the steps of this embodiment are performed relatively quickly after each other, so that any difference between the first detected response light and second detected response light is substantially caused by the differing polarization directions of the illumination light and to a lesser extent caused by other factors. It would for example be undesired if the plant moves between the detecting the first response light and detecting the second response light.

In an embodiment, detecting the response light from the plant comprises polarization filtering the response light for obtaining first response light having a first polarization direction and detecting the first response light and thereafter polarization filtering the response light for obtaining second response light having a second polarization direction that is different from the first polarization direction. This embodiment further comprises detecting the second response light. In this embodiment, the method comprises, based on the detected first and second response light, determining the growth stage of the plant. This embodiment is advantageous in that the illumination light does not need to be polarized.

Preferably, the steps of this embodiment are performed relatively quickly after each other, so that any difference between the first detected response light and second detected response light is substantially caused by the differing directions of polarization filtering and to a lesser extent caused by other factors.

Subsequently performing the two steps of polarization filtering the response light may be performed by adjusting a polarization direction of a polarization filter. This may be achieved by mechanically rotating a polarization filter and/or by changing polarization filters that are positioned in the detection path.

In an embodiment, detecting the response light from the plant comprises polarization filtering the response light for obtaining first response light having a first polarization direction and detecting the first response light and thereafter detecting the response light without polarization filtering the response light. The detected response light without polarization filtering may be referred to as second response light. In this embodiment, the method comprises, based on the detected first and second response light, determining the growth stage of the plant. This embodiment enables to identify polarization active parts of the plant in a convenient manner, for example by moving a polarization filter in and out of the detection path. This may allow to identify the polarization active parts based on similar principles as described for the embodiment wherein subsequently polarized and unpolarized illumination light is used.

In an embodiment, the method comprises both illuminating the plant with at least partially polarized illumination light and polarization filtering the response light in the detection step. This embodiment is especially advantageous if the polarization active parts of the plant change a direction of polarization of incident illumination light, whereas the rest of the plant reflects unpolarized light. As a result, the response light will have relatively strong polarized component in a certain direction, which can be easily detected in the response light using a polarization filter.

In an embodiment, the method comprises obtaining a plurality of data sets. Each data set represents a detected response light detected at a respective time instance. The plurality of data sets optionally comprises a first data set representing the first response light detected at a first time instance and a second data set representing the second response light detected at a second time instance. This embodiment also comprises, based on a development over time of the response light, indicated by the plurality of data sets, determining the growth stage of the plant. This embodiment allows to determine the growth stage of the plant based on the development of the plant over time. This allows to more accurately determine the growth stage.

In this embodiment, determining the growth stage of the plant may be performed by determining a future growth stage of the plant. This embodiment namely allows to predict the growth of the plant based on historical measurements. Advantageously, this would allow to predict the best harvest time for the plant. The historical trends may further guide a farmer for decision making on growth control, harvesting or light recipe effectiveness. A detected response light or a determined growth stage of the plant may be mapped onto an empirical graph of value along time axis for a typical plant development phasing.

This embodiment in particular may comprise determining a respective growth stage based on each data set and determining the (current) growth stage based on the previously determined respective growth stages.

Preferably, each data set includes environmental data such as growth conditions light, watering scheme used, humidity, temperature. If these parameters are not identical, the growth phase may be shifted later or earlier In an embodiment, detecting the response light comprises an, optionally computer-implemented, step of obtaining data representing an image of the plant. An image of a part of the plant, such as a flower, may be understood as an image of the plant. The image indicates detected response light, for example indicating an intensity of the response light, for respective parts of the plant, and the image comprises one or more particular image regions having a relatively high or relatively low intensity. The one or more particular image regions correspond to one or more polarization active parts of the plant that contain an optically active material and/or that contain material that exhibits polarization-selective reflection. The method comprises, based on a number and/or a size and/or a light intensity of said one or more particular image regions, determining the growth stage of the plant. This embodiment is especially advantageous if the method comprises both illuminating the plant with at least partially polarized illumination light and polarization filtering the response light in the detection step.

In case the plant is a *Cannabis* plant, the one or more high intensity regions may be understood to represent parts of the plant containing trichomes.

The determination of the growth stage is for example based on a number and/or size of the one or more polarization active parts relative to a size of a plant part where such polarization active parts are expected to form or disappear during growth of the plant. To illustrate, if the plant is a *Cannabis* plant, the trichomes are expected to form on female flowers. The growth stage may then be determined based on the percentage of the female flower's surface that is covered with trichomes.

Determining the growth stage of the plant in this embodiment may comprise determining how many pixels of the image have a light intensity that is higher than a certain threshold value.

In an embodiment in which first and second response light is detected as for example described above, detecting the response light comprises an, optionally computer-implemented, step of obtaining data representing a first image and a second image of the plant. The first image indicates the first response light from respective parts of the plant and the second image indicates the second response light from respective parts of the plant. Further, the first image comprises one or more image regions corresponding to one or more parts of the plant and the second image comprises one or more image regions corresponding to said one or more parts of the plant. Said one or more image regions of the second image have a higher or lower intensity than said one or more image regions of the first image. In this embodiment, determining the growth stage of the plant is performed based on a difference in intensity of said one or more regions between the first and second image. This embodiment allows to automatically determine the growth of the plant based on two or more images are taken from the plant.

In an embodiment, this method comprises storing the first image in association with a physical location of the respective parts of the plant. For example, the method may comprise storing the physical location of the plant and/or may comprise storing the physical location of the plant as well as the location of said respective parts relative to the plant. To illustrate, the method may comprise storing that the first image has been obtained from a plant that sits at a row x lane y in a greenhouse and more precise from the top flower of this plant. This enables the system to automatically retrieve historical images for a specific plant for comparison based on the location of the specific plant.

In an embodiment, said one or more parts of the plant are parts of the plant where polarization active material is expected to form or disappear during growth of the plant. In such case, the first and second response light may be detected a relatively long time after each other, for example one or more days. In case of a *Cannabis* plant, this embodiment for example allows automatic monitoring of the amount of trichomes on the female flower over time.

In an embodiment, said one or more parts of the plant are one or more polarization active parts of the plant that contain an optically active material and/or that contain material that exhibits polarization-selective reflection. Preferably, in this embodiment, the first and second response light are detected relatively quickly after each other. In this embodiment, the first and second response light may be understood to serve identification of the polarization active parts. In case of a *Cannabis* plant, this embodiment enables automatic detection of trichomes on the female flower.

In an embodiment, the method comprises identifying a region of interest in one or more of the images represented by the obtained data, the one or more regions of interest corresponding to one or more plant parts where polarization active parts are expected to form or disappear during growth of the plant. In this embodiment, the method comprises analyzing the identified region of interest for determining the growth stage of the plant. This embodiment is advantageous in that it enables to use computing resources only on the relevant regions of an image, for example, in case of a *Cannabis* plant, only on the image region corresponding to the female flower of the plant.

Identifying the regions of interest may be performed based on machine learning algorithms known in the art. For example, a neural network may have been trained to recognize the female flowers of a *Cannabis* plant in an image.

The image may have been obtained based on 3D ranging techniques, as a result of which the image represents a 3D model of the plant. Then, the plant parts where polarization active parts are expected to form or disappear, such as female flowers of a *Cannabis* plant, can be recognized based on their morphology. Such recognition may also be performed based on machine learning algorithms.

In an embodiment, the illumination light is at least partially linearly polarized.

In an embodiment, the illumination light is narrow-band light.

In case of a *Cannabis* plant, as trichomes change their diffuse reflection during ripening, they become either milky or amber. Depending on the detection needs, different narrowband detection ranges can be used. Cyan or blue narrowband detection can be used to distinguish between milky, transparent, and amber trichomes.

Narrow spectral band lighting and/or imaging may further increase signal to noise ratio. As used herein narrow band light may be understood to be light having a line width of between 10 to 30 nm.

In an embodiment, the method comprises presenting an indication of the determined growth stage of the plant on a display of an augmented reality system, such that a user looking at the augmented reality display sees the plant and its determined growth stage. This embodiment greatly eases harvesting, because farmers for example merely need to aim a camera at a plant and immediately see whether it is ready for harvesting.

Said display may be a transparent display. In such case, images of the plant do not need to be rendered on the display, because the user can see the plant through the transparent display.

For example, presenting on the augmented reality display an instruction to a user to pick the flower of a *Cannabis* plant may be understood as presenting an indication of the growth stage of the plant. Such instruction namely indicates that the plant has reached a growth stage at which it is suitable for harvesting. Likewise, presenting on the augmented reality display an instruction to a user to leave the flower, i.e. not pick the flower, may be understood as presenting an indication of the growth stage of the plant, because such instruction indicates that the plant has not yet reached a growth stage at which it is suitable for harvesting.

One aspect of this disclosure relates to a system for determining the growth stage of a plant. The system comprises a light source for illuminating the plant with illumination light, the illumination light causing response light from the plant. The system also comprises a detector for detecting the response light from the plant. Further, the system comprises a data processing system configured to determine, based on the detected response light, the growth stage of the plant, wherein (i) said illumination light is at least partially polarized, and/or (ii) the detector comprises a polarization filter.

Hence, a system is provided that can automate real-time and plant-by-plant the evaluation of the *Cannabis* flower status, provides input and guidance to the farmer/picker on the decision to pick/not to pick, keeps track of the picking and further allows for the forecasting of next flowering and picking timing.

In a preferred embodiment, the system is embodied as a handheld device. This may be understood as that a person can carry the entire system using one or both hands. In another preferred embodiment, the system is embodied as a head-wearable system. This may be understood as that a person can carry the entire system on his or her head.

The light source may be configured to generate monochromatic light or multi-spectral light. The detector may comprise a narrowband sensor, such as a narrowband spectral imaging sensor.

In an embodiment, the light source is configured to generate the first illumination light and subsequently the second illumination light described above. In this embodiment, the data processing system is configured to control the light source.

As light source, conveniently the light source as described in WO18114368A1, 'MULTI-MODE POLARIZED SPOT WITH ELECTRICALLY ADJUSTABLE POLARIZATION may be used.

The data processing system may in particular be configured to cause this embodiment of the system to perform any of the methods described above in which first and second illumination light is used.

In an embodiment, the detector is configured to polarization filter the response light for obtaining first response light having a first polarization direction, and to subsequently polarization filter the response light for obtaining second response light having a second polarization direction that is different from the first polarization direction. In this embodiment, the data processing system is configured to control the detector.

The data processing system may in particular be configured to cause this embodiment of the system to perform any of the methods described above in which the response light is polarization filtered.

In an embodiment, the system comprises an augmented reality system comprising a display. In this embodiment, the augmented reality system is configured to present an indication of the determined growth stage of the plant on said display, such that a user looking at the display sees the plant and its determined growth stage. In this embodiment, the system is preferably embodied as a head wearable device.

In an embodiment, the detector comprises a camera for recording images of the plant, for example the first and second image described above. This is beneficial in that it allows real-time evaluation of the growth stage of the plant as well as immediate presentation of the result to a user.

In an embodiment, the augmented reality system is configured to at least partially present the recorded images on the display. Hence, in this embodiment, both the plant and the indication of the determined growth stage are rendered on the display.

In an embodiment, the system comprises a hand-held device or head-wearable device having integrated therein said camera and the augmented reality display.

One distinct aspect of this disclosure relates to an augmented reality (AR) system for presenting plant information about a plant, such as a *Cannabis* plant. The AR system comprises a display for displaying said information. The AR system further comprises a camera for recording images of the plant. The AR system also comprises a data processing system. The data processing system is configured to determine the plant information. In an example, determining this information comprises scanning an RFID tag or normal tag associated with the plant in order to obtain a plant identifier and retrieving the plant information from a database using the obtained plant identifier. The identity of a specific plant might also be determined based on a physical location of the specific plant. Based on the location of the specific plant, the system may be able to determine which plant is under investigation. The lighting network grid might be used for determining the position of the investigated plant. The lighting network grid may for example be equipped with positioning sensing. Any manner of determining the location of the plant under investigation in combination with a floor plan of the plants can be used for determining which plant is investigated. In another example, the data processing system is configured to determine the plant information based on the recorded images, as for example using the methods for determining the growth stage of the plant described herein. The data processing system is further configured to control the display of the AR system to display the determined plant information such that a user who is looking at the display sees both the plant and the determined plant information. The AR system may comprise any feature of the augmented reality system comprised in the system for determining the growth stage of the plant.

Plant information for example indicates an age of the plant, a growth rate of the plant, a species of the plant, historical measurements relating to the plant, to be performed actions on the plant, et cetera.

In an embodiment of the AR system, the data processing system is configured to determine an action that is to be performed on the plant, such as watering the plant or harvesting the plant. The data processing in such embodiment is configured to control the display such that a user who is looking at the display sees both the plant and the determined action as plant information.

Preferably, the data processing system is configured to store any action that is performed on the plant, for example by transmitting data indicative of such action to a central database. This allows to keep track of the actions (e.g. harvesting) as performed by the user for the given plant and the status of the plants after such actions (e.g. which flowers were picked/the number of ripe flowers versus unripe/remaining flowers and the status of the unripe flowers).

Preferably, at least the display is embodied as a head-wearable device. The system may for example comprise a carrier backbone and an augmented reality goggles device as display. Said display may be a transparent display.

In an embodiment, for better flower ripeness analysis, the AR system may comprise a spectral analysis device (e.g. a hyper- or multi-spectral camera) as to analyze the recorded images of the plant on colours, reflectivity, polarization rotation, et cetera.

Optionally, the AR system comprises a light actuation device as to make the plant ripeness visible for the user, e.g. a polarized light source, a dual (or multi) wavelength light source, etc., allowing for direct information to the user without post-processing.

Optionally, the AR system comprises a light actuation device as to make the flower ripeness observable/detectable for an embedded sensor (might be same or different from above light actuation).

One aspect of this disclosure relates to a computer program comprising instructions that, when executed by the data processing system of the system for determining the growth stage of a plant, cause the system to carry out one or more, e.g. all, steps of the methods for determining the growth stage of a plant as described herein.

One aspect of this disclosure relates to a non-transitory computer-readable storage medium having stored thereon the computer program described above.

As will be appreciated by one skilled in the art, aspects of the present invention may be embodied as a system, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Moreover, a computer program for carrying out the methods described herein, as well as a non-transitory computer readable storage-medium storing the computer program are provided. A computer program may, for example, be downloaded (updated) to the existing systems or be stored upon manufacturing of these systems.

Elements and aspects discussed for or in relation with a particular embodiment may be suitably combined with elements and aspects of other embodiments, unless explicitly stated otherwise. Embodiments of the present invention will be further illustrated with reference to the attached drawings, which schematically will show embodiments according to the invention. It will be understood that the present invention is not in any way restricted to these specific embodiments.

BRIEF DESCRIPTION OF THE DRAWINGS

Aspects of the invention will be explained in greater detail by reference to exemplary embodiments shown in the drawings, in which:

FIGS. 1A-C illustrate several embodiments of the method and system;

FIGS. 3A-D schematically show several embodiments of the system;

DETAILED DESCRIPTION OF THE DRAWINGS

Figure 2C:
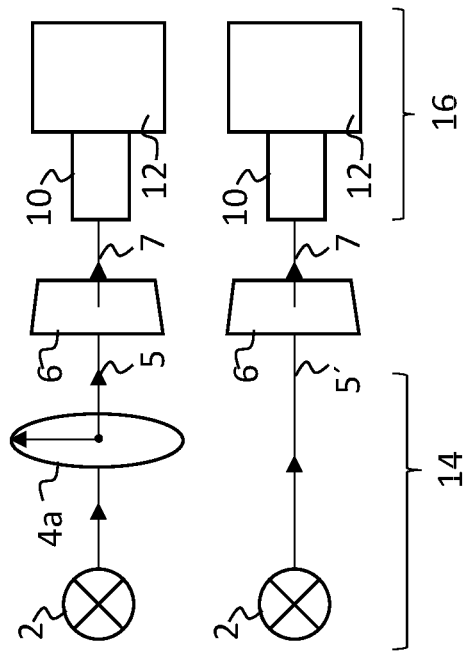
FIGS. 2A-D illustrate several embodiments of the method and system wherein the illumination light is polarized and the response light is polarization filtered.

In the figures identical reference numerals indicate similar or identical elements.

FIG. 1A (top) shows an embodiment of the method and system wherein the plant 6 is illuminated with at least partially polarized, e.g. linearly polarized, illumination light 5. In this example, the polarized illumination light 5 is generated by applying a polarization filter 4a to light that is generated by a light source 2 that is configured to generated unpolarized light. The light source 2 and polarization filter 4a together form a light source 14 that is configured to illuminate the plant 6 with at least partially polarized illumination light 5.

The illumination light 5 causes response light 7 from the plant. The illumination light may be understood to cause the plant to respond by emitting response light. The response light may comprise processed illumination light. Such processing may comprise reflecting and/or absorbing and/or changing polarization of the illumination light.

The response light 7 is detected by a detector 16, which in an example comprises a telescope 10 and an imaging system 12, such as a camera. The detector may additionally or alternatively comprise a human with polarizer glasses and/or a light sensor and/or a camera and/or a time-of-flight camera.

FIG. 1A (bottom) shows the same system yet at a later time instance. Now, another polarization filter 4b, that has another polarization direction than polarization filter 4a is used. Hence, the illumination light 5' has a different polarization direction than illumination light 5. As a result, assuming that the plant 6 comprises polarization active parts, the response light 7' differs from response light 7. Response light 7 may be referred to as first response light and response light 7' as second response light. As explained above, based on the first response light 7 and second response light 7', the growth stage of the plant 6 can be determined. Although the FIGS. 1 and 2 schematically show the response light 7 as being transmitted through the plant 6, the response light may also be light that is reflected back from the plant.

Thus, in this system, the polarization direction of the illumination light can be changed. Of course, although FIG.

1A shows only two different polarization directions for the illumination light, in an embodiment, the polarization direction of the illumination light is rotating continuously, for example over 180 degrees.

Such change of polarization direction of the illumination light may be referred to as dynamic polarized light. Such light can be created by a standard light source with mechanically rotatable polarizer mounted in front of it. Then, the polarization direction of the light sequentially shifts ('rotates') at the pace of the rotating external polarizer disk. A dynamic polarized light can also be created with a MR 16 light source with embedded mechanically rotatable polarizer. Further, dynamic polarized light can be created with a dual-(or more) polarized spot with electrically adjustable polarization. The use of multiple chip-level micro-light sources integrated in a second optics module allows to electrically (with a driver) switch polarization direction at high frequencies. Dynamic polarized illumination light can also for example be generated by controlling a liquid crystal based polarizer in front of light source, using illumination based on switchable laser sources (laser generate polarized light) with different orientation or using pixelated light source with the pixels having different polarization directions.

The system of FIG. 1A is very suitable to create a 'sparkling effect' which makes the polarization active parts of the plant, e.g. trichomes on a *Cannabis* flower, highly visible and appearing to the user (harvester) or to an automated harvesting machine. As explained above, this sparkling effect is caused by the polarization active parts responding differently to changing polarized illumination light.

As indicated above, versus a light source that is post-processed towards polarized light, dynamic polarized light can be created using a laser light source (mainly Nd:YAG lasers are linearly polarized, diode lasers are less polarized or even elliptically polarized). The laser source can be attached to an arm or combined in a horticulture lamp to scan the plant from top to bottom in order to have an in-depth canopy measurement of ripening.

FIG. 1B shows an embodiment, wherein the detector 16 is configured to polarization filter the response light in different directions subsequently. FIG. 1B (top) shows a system comprising a detector that polarization filters response light—in this example using a polarization filter 8a having a first polarization direction—in order to obtain first response light 7'. FIG. 1B (bottom) shows the same system at a later time instance. Now, the detector polarization filters the response light 7 in order to obtain differently polarized response light 7", which may be referred to as second response light. In this example, a polarization filter 8b is used that has a different polarization direction than filter 8a. Based on the first and second response light, the growth stage of plant 6 can be determined. This embodiment, also causes the above-mentioned sparkling effect, which is observable by a human and/or an automated system.

In practice, a user may use an inspection filter of which he can change the polarization (manually, motorized or electrical) to enhance the polarization characteristics of the trichomes as described above.

Figure 10:
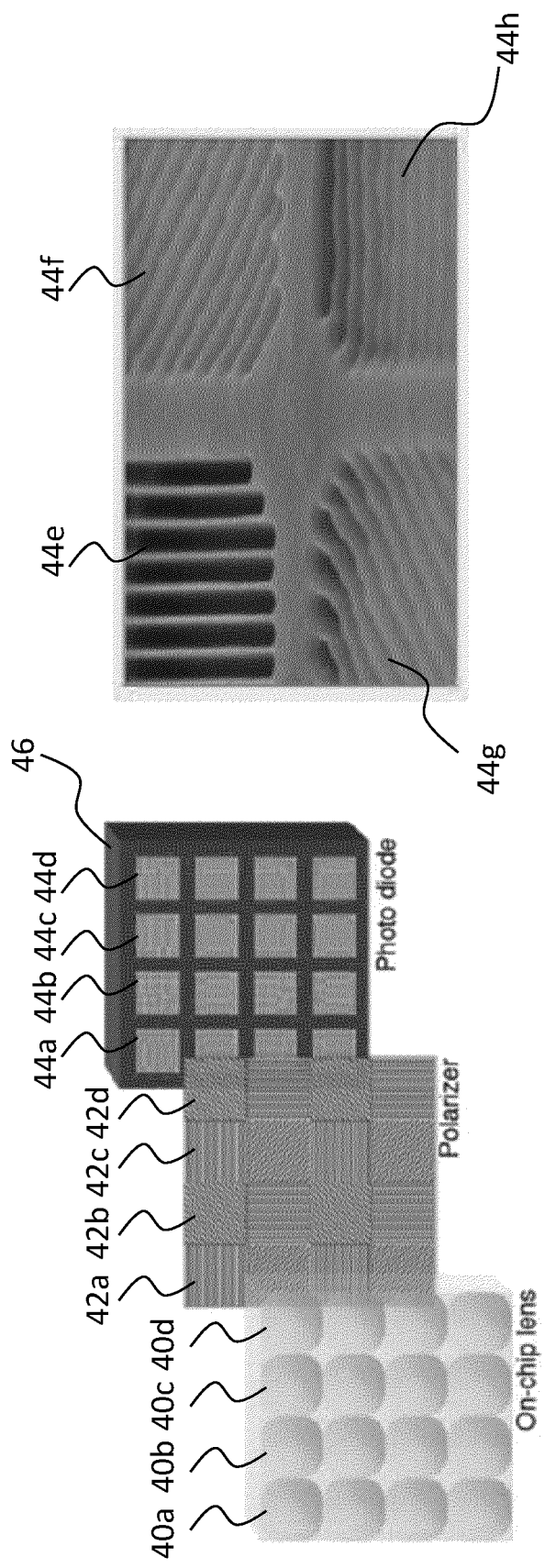
FIG. 10 shows a detector according to an embodiment.

The detector 16 may be a special camera with dedicated on-chip polarizers as shown in FIG. 10 (source: Sony, IEDM2016, lecture number 8.7). Such an imaging system has several differently oriented polarization filters 42x on respective pixels 44x of an imaging sensor 46. The filters 42x may be understood to be configured to polarization filter the response light as described herein. The filters 42x are formed during the semiconductor process in which the imaging sensor is formed. Further shown are on-chip lenses 40x for the respective pixels 44x. Such on-chip lenses 40x may also be referred to as condenser lenses and are positioned in an imaging system on top of the respective image sensor pixels 44x. Such cameras with dedicated on-chip polarizers are mainly targeted at industrial inspection applications where the detection of polarization can be used to highlight defects in materials, however, can also be advantageously used in the context of determining the growth stage of a plant.

FIG. 1C shows an embodiment, wherein both the illumination light 5 is at least partially polarized and wherein the response light 7 is polarization filtered in order to obtain polarized response light 7'. The polarization active parts may rotate the direction of the incident illumination light, whereas the rest of the plant may reflect unpolarized light, even if the illumination light is polarized. In such case, the response light will have a relatively strong component in one polarization direction, which can be made visible using a filter 8 as shown in FIG. 1C.

Figure 2D:
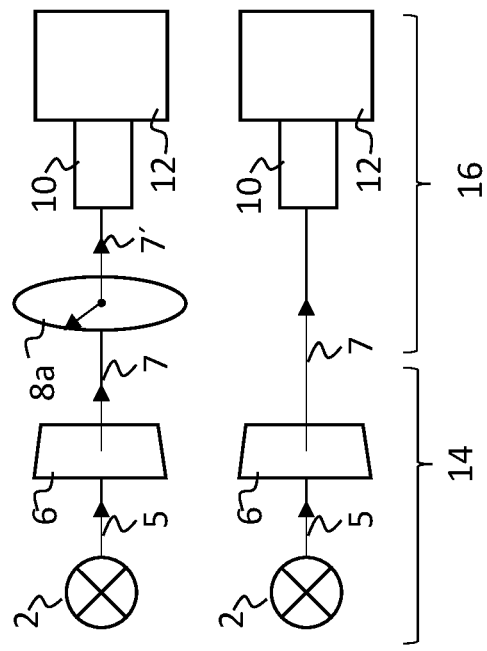
Figure 2A:
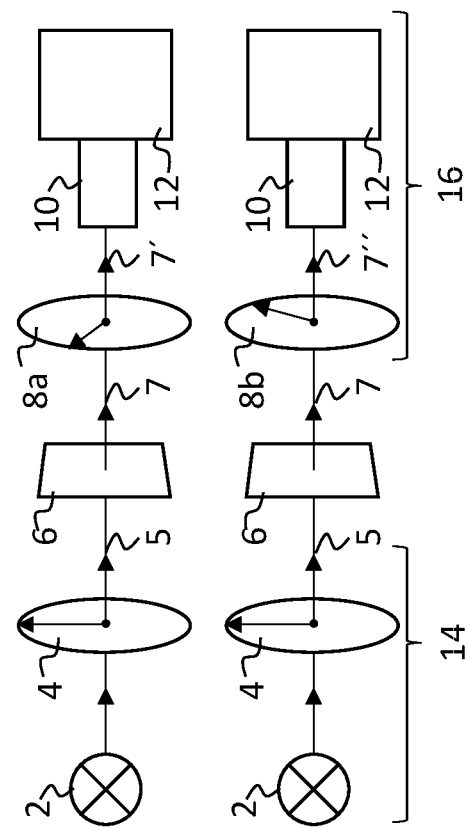

FIG. 2A shows the system of FIG. 1C at two respective time instances. Herein the detector polarization filters the response light for obtaining differently oriented polarization light at the two time instances. In this example, two different polarization filters 8a and 8b having different polarization directions are used. If the polarization active parts rotate the polarization direction whereas the rest of the plant reflects unpolarized light, with the change of polarization direction in the detection system 16, the intensity of the response light from the polarization active parts will change, while the intensity of the response light from other parts of the plant will remain substantially the same. Hence, this embodiment allows to easily detect the polarization active parts. Note that in this embodiment, response light 7' may be referred to as first response light and response light 7" may be referred to as second response light.

Figure 2B:
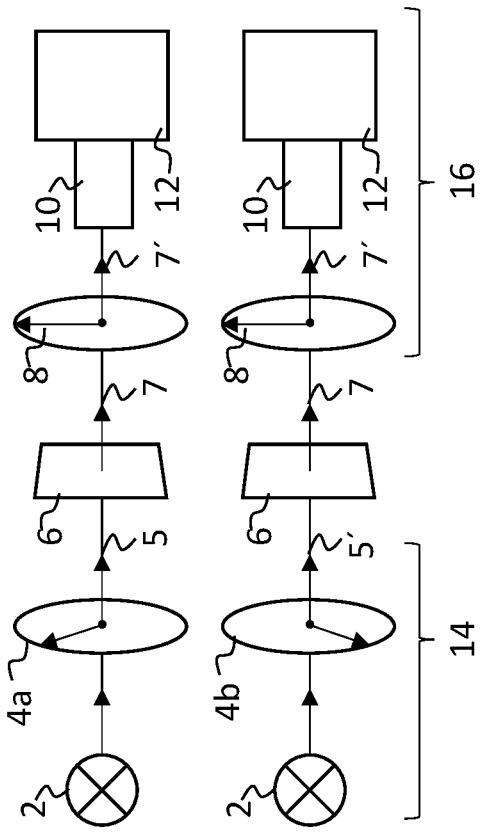

FIG. 2B shows the system of FIG. 1C at two respective time instances. Herein, the light source 14 illuminates the plant with first illumination light 5 at the first time instance and with second illumination light 5' at the second time instance. The first and second illumination light have different polarization directions. In this example, the detector polarization filters the response light 7 at the two time instances in the same way. This embodiment also allows to visualize the polarization active parts of the plant, based on the same principle described with reference to FIG. 2A.

In an embodiment, the polarization direction of the illumination light at the first time instance is different from the polarization direction of the illumination light at the second time instance and the direction of polarization filtering is different at the first time instance than at the second time instance. Preferably, the relative direction of the illumination light with respect to the direction of polarization filtering, performed by the detector 16, at the first time instance is different from this relative direction at the second time instance. For example, if the angle between the direction of polarization of the illumination light and the polarization filter of the detector at the first time instance is 10 degrees, then this angle is not 10 degrees, e.g. 50 degrees, at the second time instance.

FIG. 2C illustrates an embodiment wherein the light source 14 is configured to generate first illumination light 5 and then illumination light 5'. In particular, the embodiment illustrates that the light source at a first time instance illuminates the plant 6 with at least partially polarized light 5, referred to as first illumination light, and at a second time instance illuminates the plant 6 with unpolarized light 5', referred to as second illumination light. This embodiment allows to visualize the polarization active parts as well. In a particular embodiment, the light source may continuously switch between unpolarized light and polarized light, for example every second.

FIG. 2D illustrates an embodiment wherein the detector is configured to polarization filter the response light for obtaining first response light 7' having a first polarization direction, and to subsequently not polarization filter the response light for obtaining second response light 7 that is unpolarized. In a particular embodiment, the detector may continuously switch between a state in which it polarization filters the response light and a state in which it does not polarization filter the response light, for example every second.

Preferably, when the method involves detecting first response light at a first time instance and second response light at a second time instance and involves influencing the polarization and/or polarization direction of the illumination light and/or the response light somewhere between the first and second time instance, as shown in FIGS. 1A, 1B, 2A, 2B, 2C, 2D, the first and second response light are detected quickly after each other, for example within 10 minutes, preferably within 1 minute, most preferably within ten seconds. For creating dynamic sparkling effects, and when using solid state based electronic solutions, system can even change between states faster, e.g. with a 10-50 Hz frequency as to make effects highly effective to a human observer. These embodiments may be understood to perform such influencing in order to cause differences between the first and second response light. Based on these differences, the polarization active parts can be identified, made visible. Therefore, it is undesirable that other factors contribute to such differences, such as the formation of additional polarization active parts on the plant. This may for example happen if the second response light is detected one week later than the first response light.

FIG. 3A shows a system 20 according to an embodiment. The system comprises a light source 14 and a detector 16. The light source 14 may be any light source described herein and the detector may be any detector described herein. In this example, the light source 14 comprises a light source 2 that is configured to generate unpolarized light and a polarization filter 4. The light source 14 can thus generate at least partially polarized illumination light 5. The detector may be configured to detect response light 7. In an embodiment, the detector is configured to polarization filter the response light as described herein.

The system 20 further comprises a data processing system that is configured to determine the growth stage of a plant based on the detected response light 7. To this end, the detector 16 may be communicatively connected to the data processing system. The data processing system may be understood to be a control module of the system 20.

Preferably, the data processing system 100 is configured to control the light source 14. In an example, the data processing system 100 is configured to control the light source 2 and the polarization filter 4. The data processing system 100, upon execution of appropriate software, may be configured to switch on and of the light source 2 and/or control an intensity of the light generated by light source 2 and may be configured to control the polarization filter 4. The latter may comprise controlling a polarization direction of the filter 4, which may be achieved be mechanically moving, e.g. rotating, the polarization filter 4 and/or by moving the polarization filter 4 in and out of the path of the illumination light 5.

The data processing system 100 may also be configured, upon executing appropriate software, to control the detector 16, for example by controlling a polarization filter comprised in the detector as described herein. Such control may cause the polarization filter to move, for example rotate, to change its polarization direction and/or move the polarization in and out of the path of the response light 7 entirely.

Optionally, the system 20 comprises a display 22. The data processing system 100 may also control such display. In an example, the data processing system causes the display to present an indication of the determined growth stage of the plant, such as an instructions to harvest the plant.

FIG. 3B illustrates an embodiment of the method wherein the light source 14 hangs over the plants that are to be examined and wherein a person detects the response light 7 using a magnifying glass The light source 14 may be any light source described herein. The methods described herein can be easily realized within existing lighting infrastructure making such a solution cost-efficient and easy maintainable. The existing lighting structure for example only needs to be provided with a (controllable) polarization filter in order to form a light source 14 as described herein.

FIG. 3C illustrates an embodiment of the system wherein the light source 14 and the detector 16 are separated. The data processing system is not shown, yet may be present in the housing of detector 16, for example within a camera 16, or at least may be communicatively connected to detector 16, for example over a wireless network such as Wi-Fi.

In an embodiment, light signaling can be applied if a determined growth stage indicates that a plant is ready for harvest. In such case, the light source 14, or any other light, may indicate this. In an example, the light source above the plant may start to flicker or change color in order to indicate to a farmer or automatic harvesting system that that plant can be harvested.

Additionally or alternatively, the data processing system 100 may transmit a message to another device, for example to a handheld device of a farmer, that a particular plant has fully ripened. The data processing system can produce overall numbers about ripening of multiple plants when these are all analyzed. These numbers can be used by machine learning aids to cumulate data of previous harvest and correlate them to climate and light history parameters in order to assist/automate the decision making.

FIG. 3D illustrates an embodiment of the system 20 in which it is integrated in a handheld device. In particular, the system 20 may be understood to be an inspection tool polarizer and human detection for the onsite observation. The inspection tool dynamically controls the polarization of the luminaire and observing sensors. The user aims the illumination light 5 at the area containing trichomes (e.g. using a "crosshair") and can see the dynamic polarization effect on a built-in display 22, in this example positioned on the back of the hand-held device.

Figures 4A, 4B:
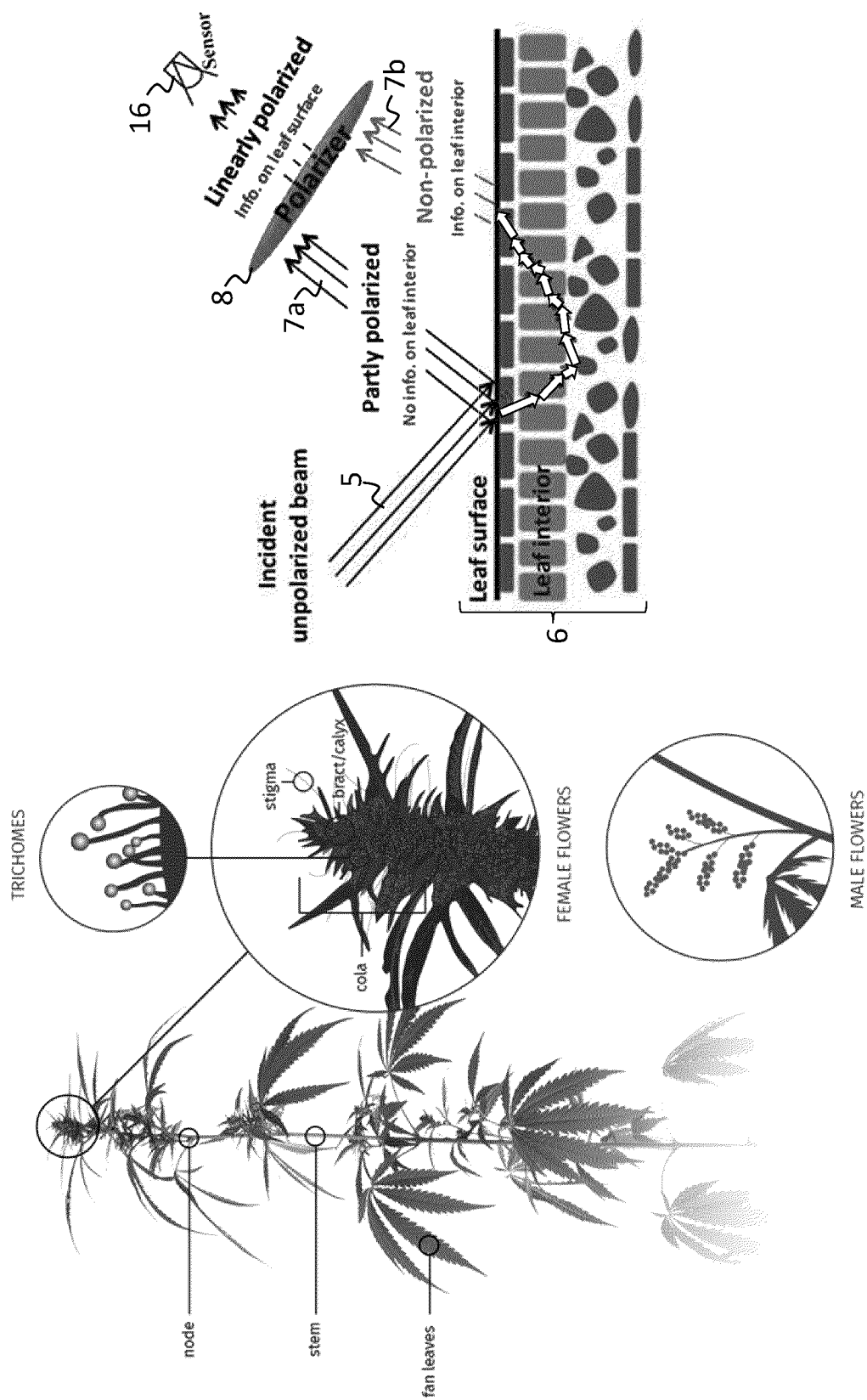
FIG. 4A depicts the anatomy of a *Cannabis* plant.
FIG. 4B shows a possible explanation as to why certain parts of the plant have different polarization characteristics.

FIG. 4A shows the anatomic properties of a *Cannabis* plant, in particular of a *Cannabis Sativa* plant. The female flower, which is typically consumed, sits at the top of the plant. Further, the trichomes, which are polarization active develop on these flowers during the growth of the plant, in particular during the ripening of the female flower. Hence, with the development of the flower, its optical properties change, in particular its polarization characteristics. Thus, the change of polarization characteristics can be linked to growth stages.

A *Cannabis* flower typically progresses through eight stages while ripening. These eight stages may be understood to be sub-growth stages of the flower ripening growth stage.

It should be appreciated that determining a growth stage of a plant may be embodied as determining such sub-growth stage. The eight stage of the *Cannabis* flower ripening are as follows:

1—The female *Cannabis* flower does not contain any stigmas.
2—First stigmas appear on the *Cannabis* flower.
3—Layer of stigmas appears on the *Cannabis* flower.
4—Continuous stigma formation on the flower.
5—Formed colas with white/milky stigmas on the flower.
6—New flowers stop and stigmas start to dry (browning)—start trichome scoring as well
7—Stigmas are drying and trichomes erect, milky white coloured.
8—Bud is ripe, time to harvest. Trichomes are full, clear coloured and less than 10% are shifting to amber color.

The transition from stage 7 to 8 is very fast and difficult to detect by a human. The methods disclosed herein enable to accurately determine when stage 8 has been reached.

FIG. 4B illustrates why the trichomes reflect polarized light 7a whereas the rest of the plant, such as a leaf, reflects unpolarized light 7b. Light 7a and light 7b together may be understood to constitute response light.

The leaf may reflect partly polarized 7a and non-polarized 7b light. However the degree of polarization (DOP) is low (more non-polarized light reflected than polarized light) due to light scattering inside the leaf as shown. In case of the trichomes, the DOP is high so that the reflected light has more polarization. When observing the leaves with a changing polarization direction the unpolarized reflected light will de dominant and thus the polarization direction will not affect the intensity of the reflected light. However, when observing the trichomes under different polarization directions the amount of observed light may vary significantly.

If the unpolarized incident beam 5 would be replaced with a polarized incident beam the leaf would still reflect unpolarized light due to internal scattering. So regardless of the polarization of the light source, the leaf will still reflect light with any polarization direction. However, the trichomes will reflect only light with a specific polarization direction. By varying the polarization direction of the light source over time, the observer—even without an explicit polarization filter—would experience the sparkling effect of the trichomes.

Figure 5:
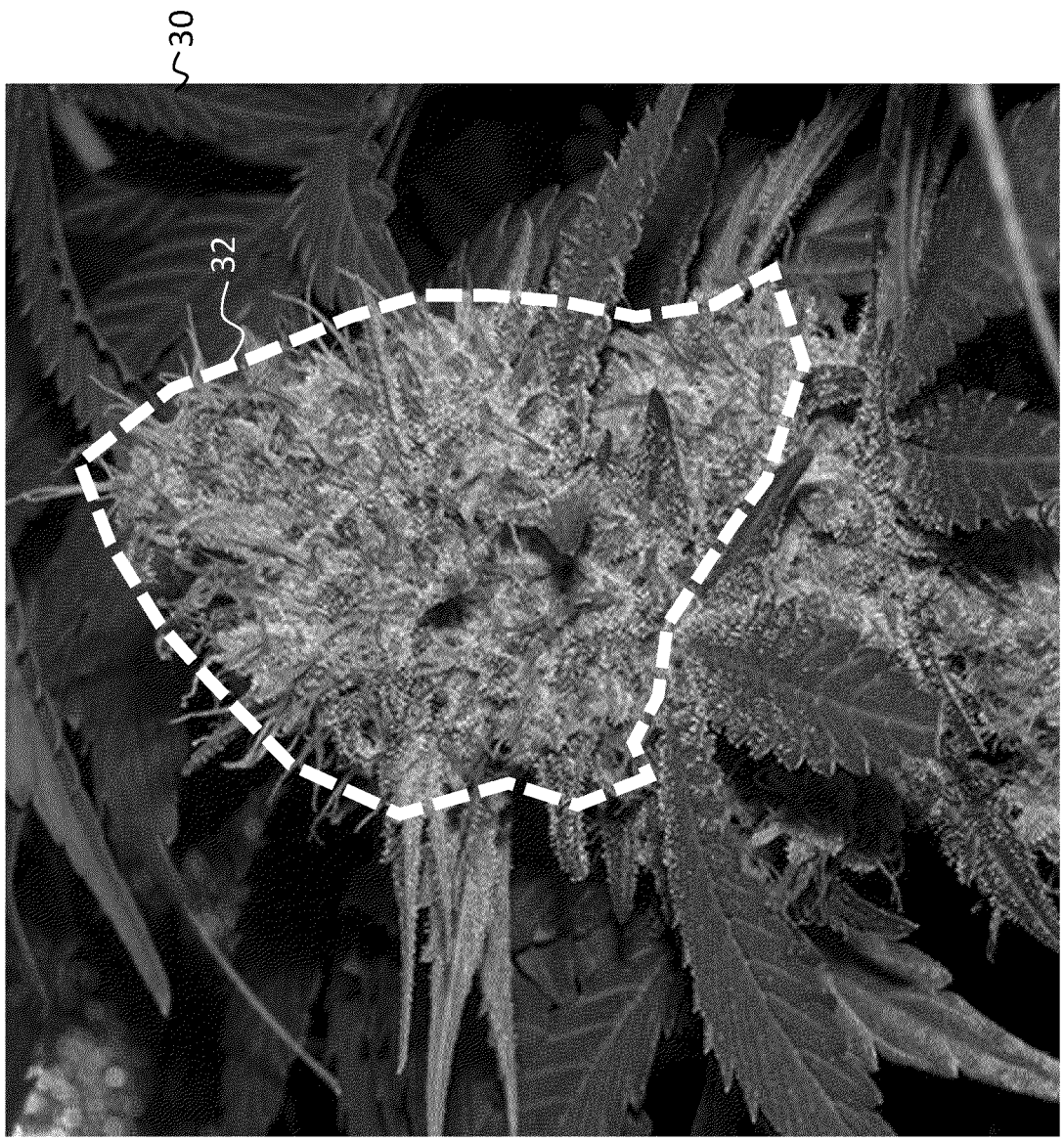
FIG. 5 shows an example of an image that may be captured by an embodiment of the system; such image may be captured while performing an embodiment of the method.

FIG. 5 shows an image 30 of a plant, in particular of a *Cannabis* plant, more in particular a female flower of a *Cannabis* plant. This image 30 may be represented by data that has been obtained by measuring response light. The image may be understood to indicate response light from respective parts of the plant. FIG. 5 further illustrates that a region of interest 32 may be identified that corresponds to a plant part where polarization active parts expected to form or disappear during growth of the plant. In this example, the region of interest 32 corresponds to the female flower of a *Cannabis* plant. Subsequent analyses may then be restricted to this region of interest 32, which allows efficient and fast data processing, which in turn allows fast, e.g. real-time, determination of the growth stage of the plant.

As explained above, such region of interest 32 may be identified based on machine learning techniques. Also, such region of interest 32 may be performed based on 3D sensing technologies. In such case, 3D ranging signals are used to obtain a representation of the three-dimensional shape of the plant. Then, the part of the plant on which polarization active parts are expected to form or disappear may be recognized based on their characteristic morphology.

Figure 6B:
FIGS. 6A-B show two images based on which the growth stage of the depicted plant can be determined.
Figure 6A:

FIGS. 6A and 6B respectively show a first image and a second image of a plant, in particular of a *Cannabis* plant, more in particular of a female flower of a *Cannabis* plant. Clearly, FIG. 6B comprises regions that have a higher intensity than corresponding regions in FIG. 6A. Two image regions in different images may be understood to be corresponding image regions if they both represent the same parts of the plant. This difference between the first and second image is caused by the subsequent detection of first and second response light, wherein the first and second response light differ. Such difference between the first and second response light may be achieved by one or more of the methods described above, such as changing the polarization of the illumination, changing the polarization filtering in the detection path, switching between polarized and unpolarized illumination light, switching between detection with polarization filtering and detection without polarization filtering, or a combination of these actions.

In particular, the trichomes, which are shown as white dots, have a higher intensity in the second image than in the first image. These figures prove that polarization of light can be used to detect the location and the ripening (development) of *Cannabis* plants, such as *Cannabis Sativa* plants.

Figure 7:
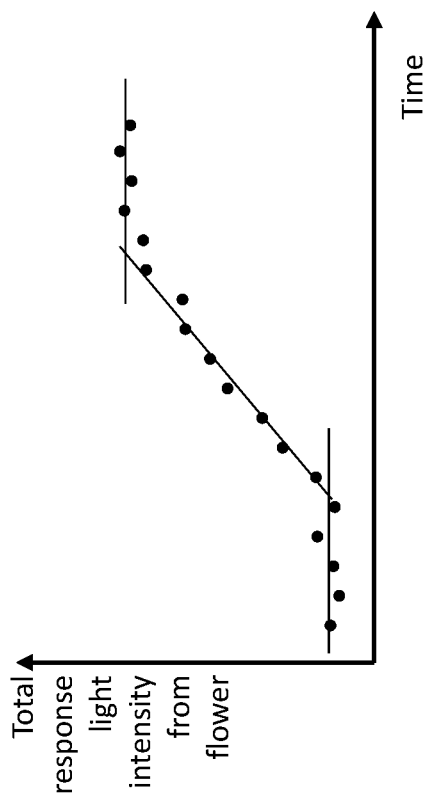
FIG. 7 illustrates how historical data can be used for determining the growth stage of a plant according to an embodiment.

FIG. 7 shows how the polarization characteristics may be registered over time to provide historical trends to the grower for decision making on growth control, harvesting or light recipe effectiveness.

FIG. 7 shows a total response light intensity from a particular flower on a particular plant with respect to time. Each data point in the graph corresponds to a data set that represents the detected response light at a respective time instance. The development over time of the response light may aid in determining a current or even a future growth stage.

FIG. 7 shows for a particular flower that at first the total intensity of the response light intensity is relatively lower and that at some point the total intensity increases until a plateau of constant total light intensity is reached. It could for example be that the flower is ready for harvesting if the total intensity has reached said plateau. Hence, in such case, the growth stage can be determined based on a development over time of the response light, indicated by the plurality of data sets.

It may also be that the increase of total light intensity endures evenly long for different plants. Then, it would be possible to predict the moment at which the total light intensity will have reached the plateau once the increase has started. This may thus allow to predict when the flower is ready for harvesting.

Figure 8B:
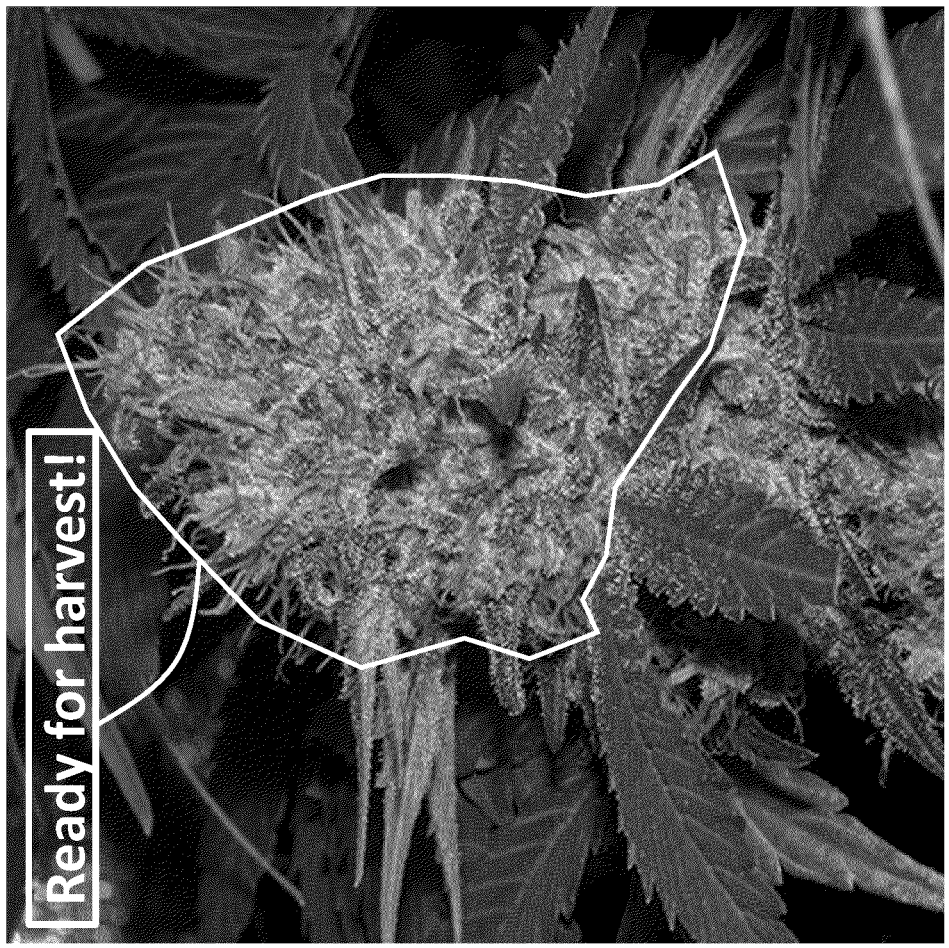
FIG. 8B illustrates a user perception of a user looking at a display of an augmented reality system.
Figure 8A:
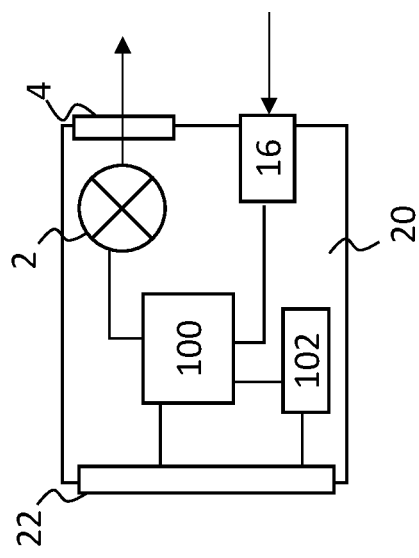
FIG. 8A schematically shows a system comprising an augmented reality system.

FIG. 8A shows an embodiment of the system 20 that comprises an augmented reality system 102. In such embodiment, display 22 may be understood to be part of the augmented reality system. The augmented reality system is configured to present an indication of the determined growth stage of the plant on said display, such that a user looking at the display sees the plant and its determined growth stage. The display 22 may be a transparent display.

The detector 16 may comprise a camera for recording images of the plant. The augmented reality system 102 may be configured to at least partially present these recorded images on display 22.

The flower picker/farmer may go into a greenhouse to check the ripeness of the *cannabis* flowers and simultaneously pick the flowers that are ready for harvesting.

Preferably, the display and the camera are integrated into a head-wearable device, such as AR glasses, so that the picker/farmer can use his/her hands to execute the 'normal' harvesting actions, e.g. picking a flower.

Through the AR glasses the picker may see the 'real' plants and superimposed on that image the locations (the flowers) that are ready to be harvested. This information on the ripeness level is created real-time, based on a sensing function embedded onto/into the AR glasses. That sensing function is combined with image processing (and possibly further enables with specific light actuation) based on object (ripe flower) recognition. The information as provided to the picker allows him/her to pick the ripe flowers.

Flowers that are in an earlier stage of development (e.g. classified in groups according to "not yet ripe at all"/ "coming to ripeness"/"almost ready for harvesting") may also be labelled during the data analysis and this information may be stored for later use, leading to a forecast functionality. So, the next day (or next harvest moment) that the picker again enters the greenhouse, the flowers that were judged as 'almost ready to harvest' might be visited by the picker preferentially, e.g. the picker is guided towards these locations in the greenhouse, allowing for a more efficient work flow (preventing looking to plants that are not harvest-ready at all, or for which the flowers have already been harvested).

To allow that last functionality, the camera on board of the AR glasses may also track the actions of the picker (resulting in stored information on the plants/flowers that have been harvested, who harvested, how much was harvested, when and at what ripeness level, also allowing to capture possible mistakes and control ownership of the flowers that are picked). Additional expert input data provided by the pickers might be captured as well with that camera, e.g. based on a gesture-based UI. Alternatively, an audio functionality might be used as UI. Picker/expert data might e.g. be such parameters as agreement/disagreement with the Machine Learning judgement on ripeness or marking via the UI any type of anomaly in the crop (e.g. disease onset) or in the horticulture system.

This information may not be needed real-time and may be (later) stored in the overall harvesting tool and made available for a next harvesting cycle or for deeper data analysis (e.g. to optimize forecasting for current and future crops).

FIG. 8B shows an example perception of a user who is looking at the display 22 of the augmented reality system. The augmented reality display 22 presents the determined growth stage of the plant next to the plant, in this example in the form of an instruction to the user to harvest the plant.

The display 22 may also present the images of the plant as for example recorded by a camera 16, in case the display is not transparent. In such case, the indication of the determined growth stage is for example overlayed on the recorded images.

Figure 9:
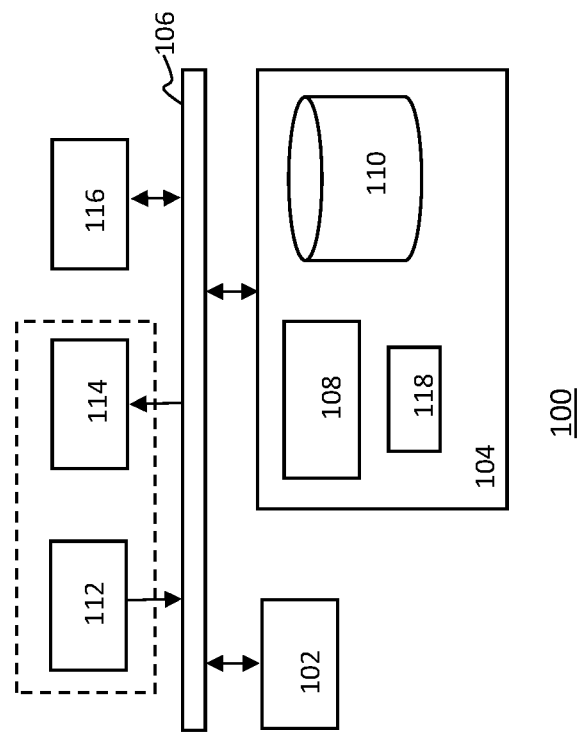
FIG. 9 schematically shows a data processing system according to an embodiment.

FIG. 9 depicts a block diagram illustrating a data processing system according to an embodiment. The data processing system may be embedded in a single device (e.g. an AR goggles), or distributed on combined wearable device and real-time accessible cloud-implemented functionality (e.g. the storage and data processing). Or alike other options.

As shown in FIG. 9, the data processing system 100 may include at least one processor 102 coupled to memory elements 104 through a system bus 106. As such, the data processing system may store program code within memory elements 104. Further, the processor 102 may execute the program code accessed from the memory elements 104 via a system bus 106. In one aspect, the data processing system may be implemented as a computer that is suitable for storing and/or executing program code. It should be appreciated, however, that the data processing system 100 may be implemented in the form of any system including a processor and a memory that is capable of performing the functions described within this specification.

The memory elements 104 may include one or more physical memory devices such as, for example, local memory 108 and one or more bulk storage devices 110. The local memory may refer to random access memory or other non-persistent memory device(s) generally used during actual execution of the program code. A bulk storage device may be implemented as a hard drive or other persistent data storage device. The processing system 100 may also include one or more cache memories (not shown) that provide temporary storage of at least some program code in order to reduce the number of times program code must be retrieved from the bulk storage device 110 during execution.

Input/output (I/O) devices depicted as an input device 112 and an output device 114 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 9 with a dashed line surrounding the input device 112 and the output device 114). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display. A network adapter 116 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 100, and a data transmitter for transmitting data from the data processing system 100 to said systems, devices and/or networks. Modems, cable modems, and Ethernet cards are examples of different types of network adapter that may be used with the data processing system 100.

As pictured in FIG. 9, the memory elements 104 may store an application 118. In various embodiments, the application 118 may be stored in the local memory 108, the one or more bulk storage devices 110, or apart from the local memory and the bulk storage devices. It should be appreciated that the data processing system 100 may further execute an operating system (not shown in FIG. 9) that can facilitate execution of the application 118. The application 118, being implemented in the form of executable program code, can be executed by the data processing system 100, e.g., by the processor 102. Responsive to executing the application, the data processing system 100 may be configured to perform one or more operations or method steps described herein.

In one aspect of the present invention, the data processing system 100 may represent an augmented reality system described herein.

In another aspect, the data processing system 100 may represent a client data processing system. In that case, the application 118 may represent a client application that, when executed, configures the data processing system 100 to perform the various functions described herein with reference to a "client". Examples of a client can include, but are not limited to, a personal computer, a portable computer, a mobile phone, or the like.

In yet another aspect, the data processing system 100 may represent a server. For example, the data processing system may represent an (HTTP) server, in which case the application 118, when executed, may configure the data processing system to perform (HTTP) server operations.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 102 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A method for determining a growth stage of a plant, the method comprising:
   illuminating the plant with illumination light, the illumination light causing response light from the plant,
   detecting the response light from the plant, and based on the detected response light, determining the growth stage of the plant;
   controlling a polarization filter to polarize light in a first polarization direction;
   polarization filtering the response light, using the polarization filter, for obtaining first response light having the first polarization direction, and detecting the first response light;
   thereafter controlling the polarization filter to polarize light in a second polarization direction that is different from the first polarization direction and polarization filtering, using the polarization filter, the response light for obtaining second response light having the second polarization direction, and detecting the second response light; and
   based on differences between the detected first and second response light resulting from polarization active parts of the plant, determining the growth stage of the plant,
   wherein illuminating the plant comprises illuminating with at least partially polarized illumination light; and/or
   wherein detecting the response light comprises polarization filtering the response light.

2. The method according to claim 1, wherein detecting the response light comprises an, optionally computer-implemented, step of obtaining data representing the detected response light, and wherein the method comprises
   based on the obtained data, determining the growth stage of the plant, wherein the obtained data indicate at least one of:
      a total intensity of the response light,
      an average intensity of the response light,
      a maximum intensity of the response light,
      a minimum intensity of the response light.

3. The method according to claim 1, wherein detecting the response light comprises an, optionally computer-implemented, step of obtaining data representing an image of the plant, the image indicating detected response light for respective parts of the plant and the image comprising one or more particular image regions having a relatively high or relatively low intensity, the one or more particular image regions corresponding to one or more polarization active parts of the plant that contain an optically active material and/or that contain material that exhibits polarization-selective reflection, the method comprising:
   based on a number and/or a size and/or a light intensity of said one or more particular image regions, determining the growth stage of the plant.

4. The method according to claim 3, further comprising:
   identifying a region of interest in one or more of the images represented by the obtained data, the one or more regions of interest corresponding to one or more plant parts where polarization active parts are expected to form or disappear during growth of the plant, and
   analyzing the identified region of interest for determining the growth stage of the plant.

5. The method according to claim 1, further comprising:
   presenting an indication of the determined growth stage of the plant on a display of an augmented reality system, such that a user looking at the augmented reality system sees the plant and its determined growth stage.

6. A system for determining a growth stage of a plant, the system comprising:
   a light source for illuminating the plant with illumination light, the illumination light causing response light from the plant, a polarization filter to polarize the response light,
a detector for detecting the response light from the plant, and
a data processing system configured to determine, based on the detected response light, the growth stage of the plant;
wherein the data processing system is adapted to control the light source and the detector to:
  control the polarization filter to polarize light in a first polarization direction;
  polarization filter the response light, using the polarization filter, for obtaining first response light having the first polarization direction, and detecting the first response light,
  thereafter control the polarization filter to polarize light in a second polarization direction that is different from the first polarization direction and polarization filter, using the polarization filter, the response light for obtaining second response light having the second polarization direction, and detecting the second response light, and
  based on differences between the detected first and second response light resulting from polarization active parts of the plant, determine the growth stage of the plant;
wherein said illumination light is at least partially polarized, and/or
wherein the detector comprises a polarization filter.

7. The system according to claim 6, further comprising:
an augmented reality system comprising a display, wherein:
  the augmented reality system is configured to present an indication of the determined growth stage of the plant on said display, such that a user looking at the display sees the plant and its determined growth stage.

8. The system according to claim 7, wherein the detector comprises a camera for recording images of the plant, and wherein the augmented reality system is configured to at least partially present the recorded images on the display.

* * * * *